US012601657B2

(12) United States Patent
Sams

(10) Patent No.: US 12,601,657 B2
(45) Date of Patent: Apr. 14, 2026

(54) SYSTEM AND METHOD FOR IDENTIFYING A TIRE CONTACT LENGTH FROM RADIAL ACCELERATION SIGNALS

(71) Applicant: Bridgestone Americas Tire Operations, LLC, Nashville, TN (US)

(72) Inventor: Thomas Anthony Sams, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 325 days.

(21) Appl. No.: 18/280,443

(22) PCT Filed: Apr. 4, 2022

(86) PCT No.: PCT/US2022/023295
§ 371 (c)(1),
(2) Date: Sep. 5, 2023

(87) PCT Pub. No.: WO2022/231782
PCT Pub. Date: Nov. 3, 2022

(65) Prior Publication Data
US 2024/0118175 A1 Apr. 11, 2024

Related U.S. Application Data

(60) Provisional application No. 63/180,735, filed on Apr. 28, 2021.

(51) Int. Cl.
*G01M 17/02* (2006.01)
*G01P 7/00* (2006.01)

(52) U.S. Cl.
CPC ............... *G01M 17/02* (2013.01); *G01P 7/00* (2013.01)

(58) Field of Classification Search
None
See application file for complete search history.

(56) References Cited

U.S. PATENT DOCUMENTS

| 6,550,320 B1 | 4/2003 | Giustino |
| 7,546,764 B2 | 6/2009 | Morinaga et al. |

(Continued)

FOREIGN PATENT DOCUMENTS

| CN | 109641496 B | 2/2021 | |
| EP | 4434770 A2 * | 9/2024 | ............. H04L 12/40 |

(Continued)

OTHER PUBLICATIONS

Japanese Office Action for corresponding patent application No. 2023558959, Aug. 13, 2024, 4 pages.

(Continued)

*Primary Examiner* — Peter J Macchiarolo
*Assistant Examiner* — Jermaine L Jenkins

(57) ABSTRACT

Systems and methods are disclosed herein for estimating at least one force acting upon a vehicle-mounted tire. An acceleration waveform (150) of the tire is detected in a tire radial direction from sampled outputs of a tire-mounted acceleration sensor (118). The acceleration waveform is integrated in the tire radial direction to generate a velocity waveform (step 220). A number of samples during ground contact are calculated from at least first and second peaks in the velocity waveform, wherein a ground contact length is calculated based on at least the calculated number of samples during ground contact, a sampling rate of the outputs of the tire-mounted acceleration sensor, and a velocity of the vehicle. At least one force acting on the tire is estimated from at least the calculated ground contact length (166), and an output signal is generated corresponding to the estimated at least one force acting on the tire.

20 Claims, 4 Drawing Sheets

(56)                References Cited

U.S. PATENT DOCUMENTS

| | | | | |
|---|---|---|---|---|
| 7,942,048 | B2 * | 5/2011 | Pingel | G01P 3/48 |
| | | | | 73/146.5 |
| 8,204,645 | B2 | 6/2012 | Weston | |
| 9,310,242 | B2 | 4/2016 | Kammann et al. | |
| 10,245,906 | B2 | 4/2019 | Singh et al. | |
| 10,549,587 | B2 | 2/2020 | Kollmitzer et al. | |
| 10,636,227 | B2 | 4/2020 | Wittmann et al. | |
| 10,684,161 | B2 | 6/2020 | Masago | |
| 11,820,177 | B2 * | 11/2023 | Kim | B60C 11/243 |
| 2007/0240501 | A1 | 10/2007 | Mancosu et al. | |
| 2007/0240502 | A1 | 10/2007 | Morinaga et al. | |
| 2014/0005956 | A1 | 1/2014 | Patel et al. | |
| 2017/0334254 | A1 | 11/2017 | Limbrunner et al. | |
| 2019/0118592 | A1 | 4/2019 | Kollmitzer et al. | |

FOREIGN PATENT DOCUMENTS

| | | |
|---|---|---|
| JP | 2007106243 A | 4/2007 |
| JP | 2007331659 A | 12/2007 |
| JP | 2009019950 A | 1/2009 |
| JP | 5183114 B2 | 4/2013 |
| WO | 2020101849 A1 | 5/2020 |

OTHER PUBLICATIONS

Vibration, Accelerometer Based Method for Tire Load and Slip Angle Estimation, Singh and Taheri, Feb. 9019, 13 pages.

MDPI, Tire-pressure identification using intelligent tire with three-axis accelerometer, Zhu et al., Jan. 2019, 13 pages.

Tire Science and Technology 44, No. 4, Estimation of the tire contact patch length and normal load using intelligent tires and its application in small ground robot to estimate the tire-road friction, 2016, 14.

International Search Report, corresponding application No. PCT/US2022/023295, Jul. 13, 2022, 5 pages.

* cited by examiner

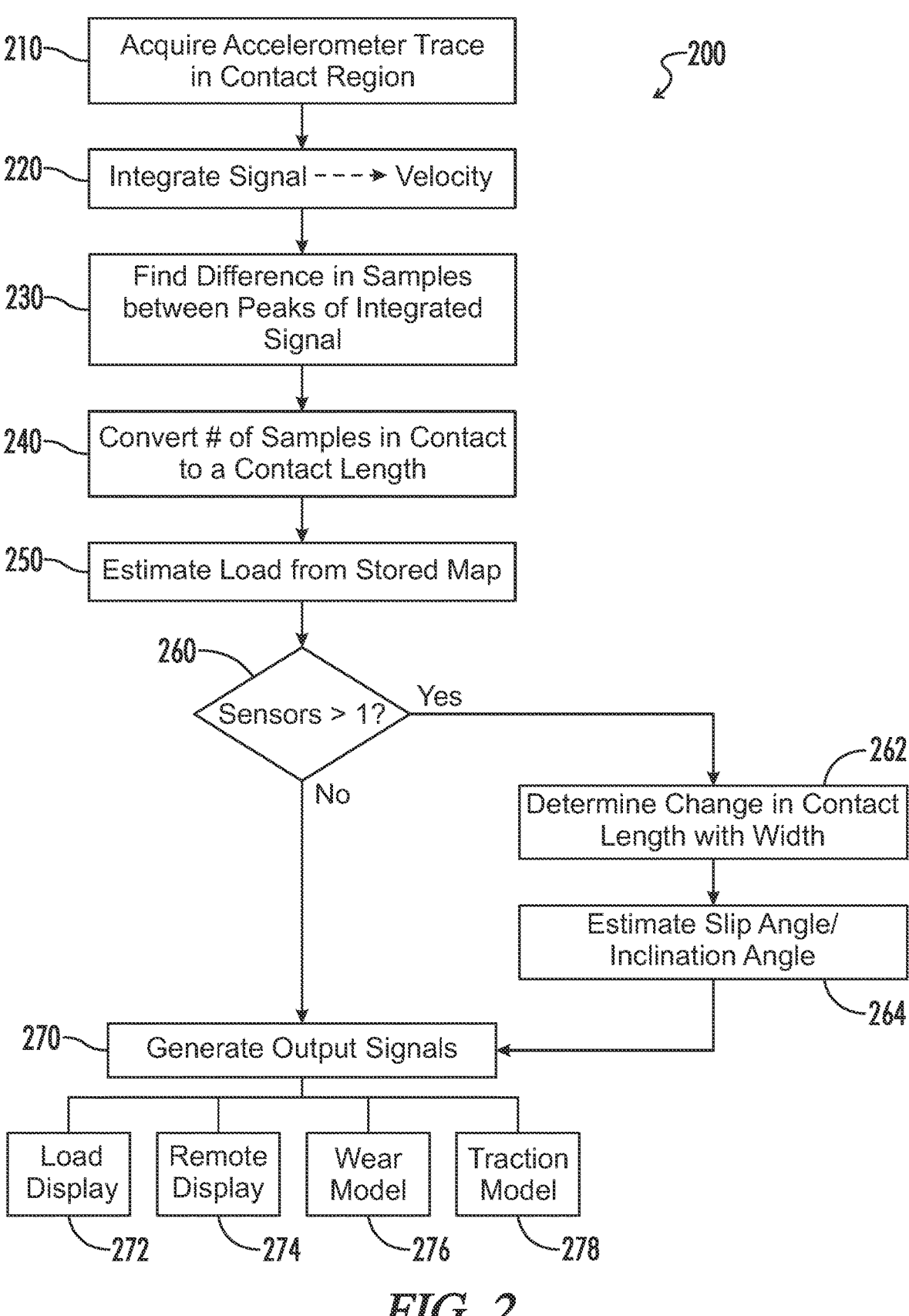

210 — Acquire Accelerometer Trace in Contact Region

220 — Integrate Signal ---▸ Velocity

230 — Find Difference in Samples between Peaks of Integrated Signal

240 — Convert # of Samples in Contact to a Contact Length

250 — Estimate Load from Stored Map

260 — Sensors > 1?

Yes

No

262 — Determine Change in Contact Length with Width

Estimate Slip Angle/ Inclination Angle — 264

270 — Generate Output Signals

Load Display — 272

Remote Display — 274

Wear Model — 276

Traction Model — 278

SYSTEM AND METHOD FOR IDENTIFYING A TIRE CONTACT LENGTH FROM RADIAL ACCELERATION SIGNALS

TECHNICAL FIELD

The present disclosure relates generally to quantifying performance aspects of tires on wheeled motor vehicles. More particularly, systems, methods, and related algorithms as disclosed herein relate to the identification of a ground contact length for tires of wheeled motor vehicles including but not limited to motorcycles, consumer vehicles (e.g., passenger and light truck), commercial and off-road (OTR) vehicles, based at least in part on radial acceleration signals from tire-mounted sensors.

BACKGROUND ART

The tire contact patch is one of the most useful indicators of tire performance. It can be directly tied to certain operational conditions such as the load, inclination angle, and slip angle on the tire. These are all vital pieces of information for understanding the wear, health, and tractional potential of the tire.

Prediction of such performance measurements is an important tool for anyone owning or operating vehicles, particularly in the context of fleet management. As tires are used, it is normal for the tread to gradually become shallower and overall tire performance to change. At a certain point it becomes critical to be aware of the tire conditions, as insufficient tire tread can create unsafe driving conditions. For example, when road conditions are non-optimal the tires may be unable to grip the road and a driver may lose control of his or her vehicle. Generally stated, the shallower the tire tread, the more easily the driver may lose traction when driving in rain, snow, or the like.

Typical on-vehicle sensor measurements for a vehicle such as a heavy truck may include vehicle speed, radial acceleration, ambient temperature, tire inflation pressure, and tire contained air temperature (CAT). These measurements are all vital when extending them to higher order predictions such as wear and durability. However, one of the most important pieces of information is still typically missing- the load acting upon the tire, conventional sensors for which may be prohibitively expensive and/or unreliable.

DISCLOSURE OF THE INVENTION

In view of the aforementioned deficiencies in conventional systems, approaches as disclosed herein for determining the contact length of a tire may be implemented to estimate operational condition indicators, such as for example the load acting upon the tire, that are vital to understanding the wear, durability, traction, and other performance criteria of the tire.

Generally stated, a system and method of the present disclosure may be used to estimate the contact length of the tire, which can be directly correlated to the load on the tire. High frequency accelerometer data (>1 kHz) may preferably be acquired with a tire-mounted sensor (TMS). Once this data is acquired, an algorithm determines the start and end of the contact patch which is then corrected for the rotational speed of the tire, and finally estimates the load via a mapped relationship such as via a stored lookup table or correlation equation.

Various embodiments of the method may desirably improve upon conventional tools for contact length estimation because it acts as a filter for noisy peaks in sensor output data, as well as providing a robust methodology for identifying both the start and end of contact.

A first exemplary embodiment of a computer-implemented method as disclosed herein may be provided for estimating at least one force acting upon at least one tire mounted on a vehicle. The method includes detecting an acceleration waveform of a tire in a tire radial direction from sampled outputs of a tire-mounted acceleration sensor, and then integrating the acceleration waveform in the tire radial direction to generate a velocity waveform. A number of samples during ground contact are calculated from at least first and second peaks in the velocity waveform, wherein a ground contact length may further be calculated based on at least the calculated number of samples during ground contact, a sampling rate of the outputs of the tire-mounted acceleration sensor, and a velocity of the vehicle. At least one force acting on the tire can be estimated from the calculated ground contact length, wherein an output signal is generated corresponding to the estimated at least one force acting upon the tire.

In a second embodiment, exemplary aspects according to the above-referenced first embodiment may include that each of the steps according to the above-referenced embodiment may be performed for each of a plurality of acceleration sensors mounted laterally across an inner liner of the tire, wherein changes in ground contact length may be calculated with respect to a respective width between two or more of the plurality of acceleration sensors. One or more forces on the tire may further be estimated based on the calculated changes in ground contact length with respect to a respective width between two or more of the plurality of acceleration sensors.

In a third embodiment, exemplary aspects according to the above-referenced first or second embodiment may include that the estimated one or more forces acting upon the tire comprise a slip angle on the tire, and/or an inclination angle.

In a fourth embodiment, exemplary aspects according to the above-referenced first to third embodiments may include that at least one map is predetermined and retrievably stored, and which represents a relationship between the ground contact length, the velocity of the vehicle, and a load acting on the tire. The load acting on the tire may accordingly be estimated from the calculated ground contact length, the velocity of the vehicle, and the at least one map.

In various embodiments, exemplary aspects according to the above-referenced first to fourth embodiments may further include that the output signal may be provided to a user interface associated with the vehicle for display to a user of the vehicle, and/or a user interface associated with a remote computing device via a fleet management telematics platform, and/or a vehicle control unit.

In the case where the output signal is provided to a vehicle control unit, the estimated load may for example be utilized as an input to a tire wear detection model, and/or to a tire traction detection model, and/or to a tire durability and health model.

In another embodiment as disclosed herein, a system is provided for estimating at least a load acting on at least one tire mounted on a vehicle. The system comprises a tire-mounted acceleration sensor configured to generate output signals corresponding to sampled acceleration of a tire in a tire radial direction, and a controller linked for communication with the tire-mounted acceleration sensor. The controller is further configured to direct the performance of steps in a method according to any of the above-referenced first to fourth embodiments and optionally any one or more of the further above-referenced aspects according thereto.

BRIEF DESCRIPTION OF THE DRAWINGS

Hereinafter, embodiments of the invention are illustrated in more detail with reference to the drawings.

FIG. 2 is a flowchart representing an embodiment of a tire load estimation method as disclosed herein.

BEST MODE FOR CARRYING OUT THE INVENTION

Figure 1:
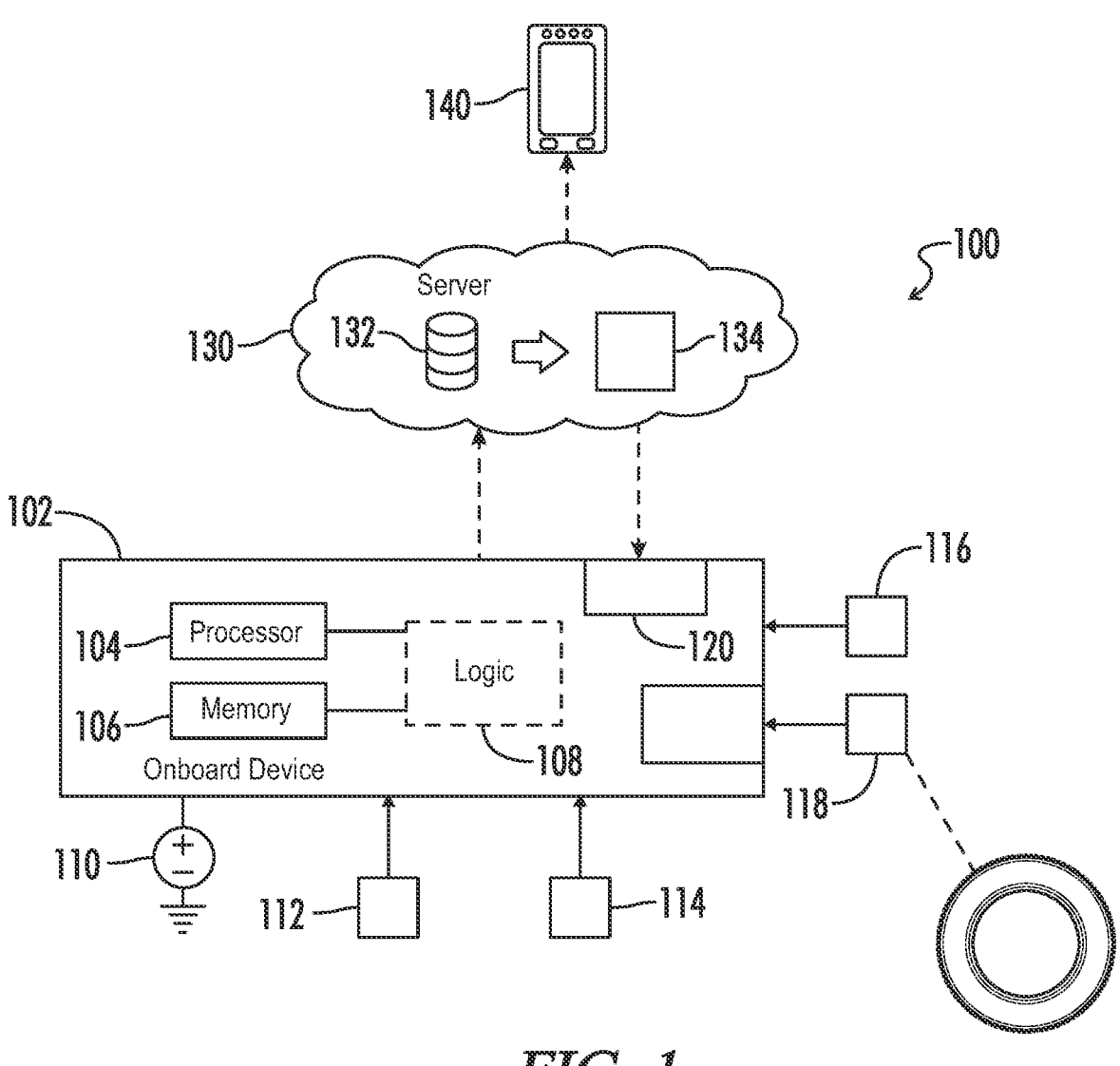
FIG. 1 is a block diagram representing an embodiment of a tire load estimation system as disclosed herein.

Referring generally to FIGS. 1-7, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual vehicles) for effectively implementing models as disclosed herein. Referring initially to FIG. 1, an exemplary embodiment of the system 100 includes a data acquisition device 102 that is onboard a vehicle and configured to at least obtain data and transmit said data to one or more downstream computing devices (e.g., a remote server 130) to perform relevant computations as disclosed herein. The data acquisition device may be a standalone sensor unit (not shown) appropriately configured to collect raw measurement signals, such as for example signals corresponding to a tire's radial acceleration, contained air temperature and/or internal air pressure, and to continuously or selectively transmit such signals to downstream computing devices. The data acquisition device 102 may include an onboard computing device 102 in communication with one or more distributed sensors and which is portable or otherwise modular as part of a distributed vehicle data collection and control system, or otherwise may be integrally provided with respect to a central vehicle data collection control system. The data acquisition device 102 may include a processor 104 and memory 106 having program logic 108 residing thereon, and in various embodiments may comprise a vehicle electronic control unit (ECU) or a component thereof, or otherwise may be discrete in nature, for example permanently or detachably provided with respect to a vehicle mount.

Generally stated, a system 100 as disclosed herein may implement numerous components distributed across one or more vehicles, for example but not necessarily associated with a fleet management entity, and further a central server network or event-driven serverless platform in functional communication with each of the vehicles motor via a communications network.

The illustrated embodiment may include for illustrative purposes, without otherwise limiting the scope of the present invention thereby, a tire-mounted sensor unit 118, an ambient temperature sensor 112, a vehicle speed sensor 114 configured to collect for example acceleration data associated with the vehicle, position sensors 116 such as global positioning system (GPS) transponders, and a DC power source 110. The tire mounted sensor unit 118 may include one or more sensors configured to generate output signals corresponding to tire conditions including but not limited to radial acceleration, contained air temperature, inflation pressure, and the like, and such sensors may take any of various forms known to one of skill in the art for providing such signals. Various bus interfaces, protocols, and associated networks are well known in the art for the communication between the respective data sources and the local computing device 102, and one of skill in the art would recognize a wide range of such tools and means for implementing the same.

In some embodiments, data acquisition devices and equivalent data sources as disclosed herein are not necessarily limited to vehicle-specific sensors and/or gateway devices and can also include third party entities and associated networks, program applications resident on a user computing device such as a driver interface, a fleet management interface, and any enterprise devices or other providers of raw streams of logged data as may be considered relevant for algorithms and models as disclosed herein.

In some embodiments, one or more of the various sensors 112, 114, 116, 118 may be configured to communicate with downstream platforms without a local vehicle-mounted device or gateway components, such as for example via cellular communication networks or via a mobile computing device (not shown) carried by a user of the vehicle.

The system may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device in some embodiments being functionally linked to the onboard device via a communications network. System programming information may for example be provided on-board by the driver or from a fleet manager.

The term "user interface" as used herein may, unless otherwise stated, include any input-output module by which a user device facilitates user interaction with respect to a processing unit, server, device, or the like as disclosed herein including, but not limited to: downloaded or otherwise resident program applications; web browsers; web portals, such as individual web pages or those collectively defining a hosted website; and the like. A user interface may further be described with respect to a personal mobile computing device in the context of buttons and display portions which may be independently arranged or otherwise interrelated with respect to, for example, a touch screen, and may further include audio and/or visual input/output functionality even without explicit user interactivity.

Vehicle and tire sensors 112, 114, 116, 118, etc., may in an embodiment further be provided with unique identifiers, wherein an onboard device processor can distinguish between signals provided from respective sensors on the same vehicle, and further in certain embodiments wherein a central processing unit and/or fleet maintenance supervisor client device may distinguish between signals provided from tires and associated vehicle and/or tire sensors across a plurality of vehicles. In other words, sensor output values may in various embodiments be associated with a particular tire, a particular vehicle, and/or a particular tire-vehicle system for the purposes of onboard or remote/downstream data storage and implementation for calculations as disclosed herein. An onboard data acquisition device 102 may communicate directly with the downstream processing stage 130 as shown in FIG. 1, or alternatively the driver's mobile device or truck-mounted computing device may be configured to receive and process/transmit onboard device output data to one or more downstream processing units.

Raw signals received from a tire-mounted sensor 118 may be stored in onboard device memory 106, or an equivalent local data storage network functionally linked to the onboard device processor 104, for selective retrieval and transmittal via a data pipeline stage as needed for calculations according to the method disclosed herein. A local or downstream "data storage network" as used herein may refer generally to individual, centralized, or distributed logical and/or physical entities configured to store data and enable selective retrieval of data therefrom, and may include for example but without limitation a memory, look-up tables, files, registers, databases, database services, and the like. In some embodiments, raw data signals from the various sensors 112, 114, 116, 118 may be communicated substantially in real time from the vehicle to a downstream processing unit such as server 132. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the processing unit via an appropriate (e.g., cellular) communications network.

The vehicle data and/or tire data, once transmitted via a communications network to a downstream server 132 or equivalent processing system, may be stored for example in a database 134 associated therewith and further processed or otherwise retrievable as inputs for processing via one or more algorithmic models as disclosed herein. The models may be implemented at least in part via execution of a processor, enabling selective retrieval of the vehicle data and/or tire data and further in electronic communication for the input of any additional data or algorithms from a database, lookup table, or the like that is stored in association with the processing unit.

Referring hereafter to FIGS. 2-5, an embodiment of a method 200 may now be described for estimating at least one force acting upon at least one tire mounted on a vehicle.

Figure 3:
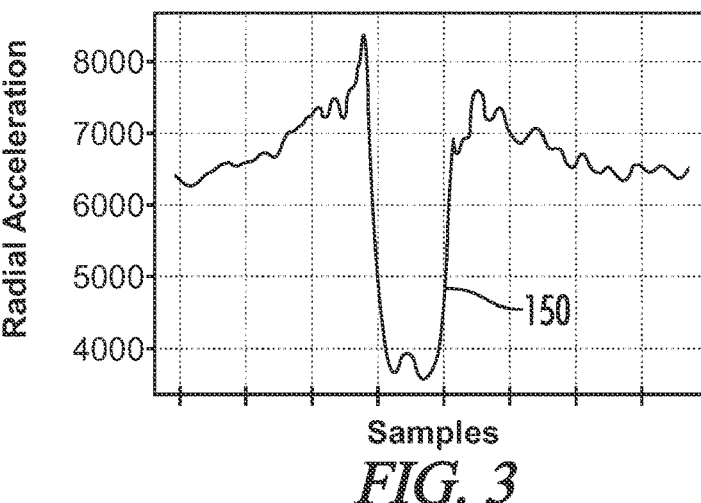
FIG. 3 is a graphical diagram representing an exemplary radial acceleration waveform.
Figure 4:
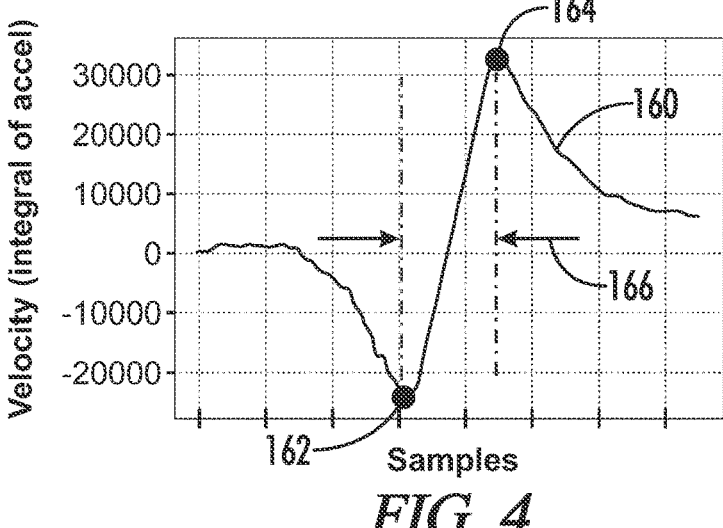
FIG. 4 is a graphical diagram representing an exemplary waveform resulting from integration of the radial acceleration waveform of FIG. 3.

A first step 210 of the exemplary method 200, with illustrative reference to FIG. 3, includes detecting an acceleration waveform 150 of a tire in a tire radial direction from sampled outputs of a tire-mounted acceleration sensor 118. In an embodiment, the sampled output comprises high frequency accelerometer data (e.g., >1 kHz), but a method as disclosed herein is not so limited unless otherwise expressly noted.

The acceleration waveform may then be integrated in the tire radial direction to generate a velocity waveform (step 220), wherein a number of samples during ground contact are calculated from at least first and second peaks in the velocity waveform (step 230). With illustrative reference to FIG. 4, and from a physical understanding of the velocity (integrated acceleration) profile 160, one of skill in the art may appreciate that the entrance and exit of the ground contact patch (footprint) 166 are identifiable as corresponding with the peaks 162 and 164, respectively. A difference may be determined in the number of samples between the peaks 162 and 164 of the integrated accelerometer signal, accordingly corresponding with the number of samples taken in the footprint area 166. One particular advantage of such a step, with respect for example to conventional techniques, may be that the integration acts as a filter to filter out noisy peaks in the accelerometer data 150.

In a next step 240, a length of the ground contact patch 166 may further be calculated based on at least the calculated number of samples during ground contact, a sampling rate of the outputs of the tire-mounted acceleration sensor, and a velocity of the vehicle.

Figure 5:
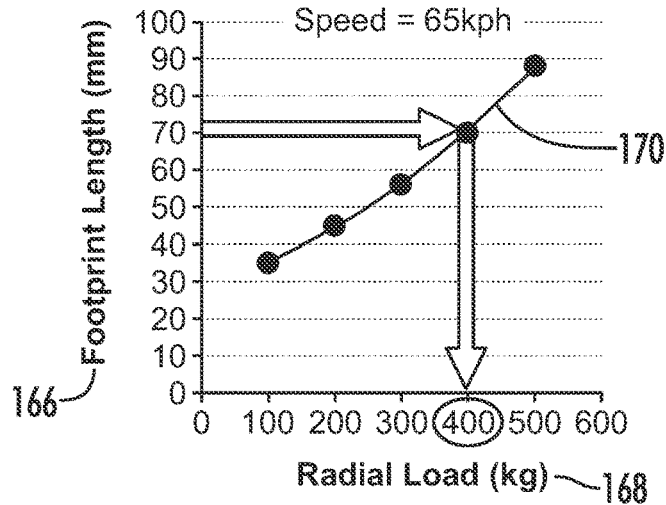
FIG. 5 is a graphical diagram representing an exemplary mapped relationship between a calculated ground contact (footprint) length, a load acting on the tire, and a velocity of the vehicle upon which the tire is mounted.

At least one force acting on the tire can be estimated from at least the calculated ground contact length (step 250). The at least one force may for example the radial load acting on the tire, estimated using at least the calculated ground contact length, the tire inner inflation pressure, and the velocity of the vehicle. In an embodiment, at least one map (e.g., lookup table, correlation equation, etc.) may be predetermined and retrievably stored, and which for example represents a relationship between the ground contact length, the velocity of the vehicle, the tire inner inflation pressure, and a load acting on the tire. As illustrated in FIG. 5, the load 168 acting on the tire may accordingly be estimated from the calculated ground contact length 166, the velocity of the vehicle (e.g., 65 kph), and a defined curve 170 on a corresponding map.

In various embodiments, alternative forces may be estimated using an analogous technique. For example, multiple sensors may be positioned laterally across a tire inner liner (step 260), wherein a change in contact length may be determined with respect to width (step 262). This information can then be used to determine the slip angle or inclination angle on the tire, and by extension the cornering force (step 264).

The method 200 may further continue wherein an output signal is generated corresponding to the estimated at least one force, e.g. radial load, acting upon the tire (step 270). In various embodiments, the output signal may be provided to a user interface associated with the vehicle for local display to a user of the vehicle (step 272), and/or a user interface associated with a remote computing device via for example a fleet management telematics platform (step 274), and/or a vehicle control unit. In the case where the output signal is provided to a vehicle control unit, the estimated load may for example be utilized as an input to a tire wear detection model (step 276), and/or to a tire traction detection model (278).

An exemplary tire wear model may estimate tire wear values based on, e.g., "digital twin" virtual representations of various physical parts, processes or systems wherein digital and physical data is paired and combined with learning systems such as for example neural networks. For example, the above-referenced output signals and associated location/route information may be provided to generate a digital representation of the vehicle tire for estimation of tire wear, wherein subsequent comparison of the estimated tire wear with a determined actual tire wear may be implemented as feedback for the machine learning algorithms. The wear model may be implemented at the vehicle, for processing via the onboard system, or the tire data and/or vehicle data may be processed to provide representative data to the hosted server for remote wear estimation.

In various embodiments, the method may further involve predicting wear values at one or more future points in time, wherein such predicted values may be compared to respective threshold values. For example, a feedback signal corresponding to the predicted tire wear status (e.g., predicted tread depth at a given distance, time, or the like) may be provided via an interface to an onboard device associated with the vehicle itself, or to a mobile device associated with a user, such as for example integrating with a user interface configured to provide alerts or notice/recommendations that a tire should or soon will need to be replaced. Other tire-related threshold events can be predicted and implemented for alerts and/or interventions within the scope of the present disclosure and based on predicted tire wear, including for example tire rotation, alignment, inflation, and the like. The system may generate such alerts and/or intervention recommendations based on individual thresholds, groups of thresholds, and/or non-threshold algorithmic comparisons with respect to predetermined parameters.

As another example, a hierarchical wear model as disclosed herein may enable fleet management systems to track performance of not only specific vehicles and tires, but associated routes, drivers, and the like. Using the predicted wear rates obtained via the methods herein, a fleet manger may for example ascertain which trucks, drivers, routes, and/or tire models are burning through tread the fastest, or conversely, saving tread. Furthermore, accurate wear modeling may preferably provide decision support with respect to fleet tire purchasing. Wear out prediction may for example be aggregated into a projected tire purchase estimation model for a given year, month, week, or the like.

As another example, an autonomous vehicle fleet may comprise numerous vehicles having varying minimum tread status values, wherein the fleet management system may be configured to proactively disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

A tire wear status (e.g., tread depth) may for example be provided along with the above-referenced output signals as inputs to a traction model, which may be configured to provide an estimated traction status or one or more traction characteristics for the respective tire. As with the aforementioned wear model, the traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed at a server level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be incorporated into an active safety system. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model 278 to disable or otherwise selectively remove vehicles with low tread depth from use during inclement weather, or potentially to limit their maximum speeds.

In some embodiments, the method 200 may also involve providing inputs such as the estimated forces acting on the tire, the estimated wear, alone or in combination with other relevant metrics of severity of use of the tire, as inputs to a tire durability and health model. Such a model may be implemented for estimating relative fatigue characteristics, for example as an indicator of durability events such as tread/belt separations. Such a model may also for example be implemented for estimating relative tire aging characteristics or predicting wear state at one or more future points in time. Feedback signals corresponding to such durability events may be provided via an interface to an onboard device 102 associated with the vehicle itself, or to a mobile device associated with a user, such as for example integrating with a user interface configured to provide alerts or notice/recommendations of an intervention event, such as for example that one or more tires should or soon will need to be replaced, rotated, aligned, inflated, and the like. Outputs from a tire durability and health model may further or in the alternative be provided to the traction model referenced above.

Figure 6:
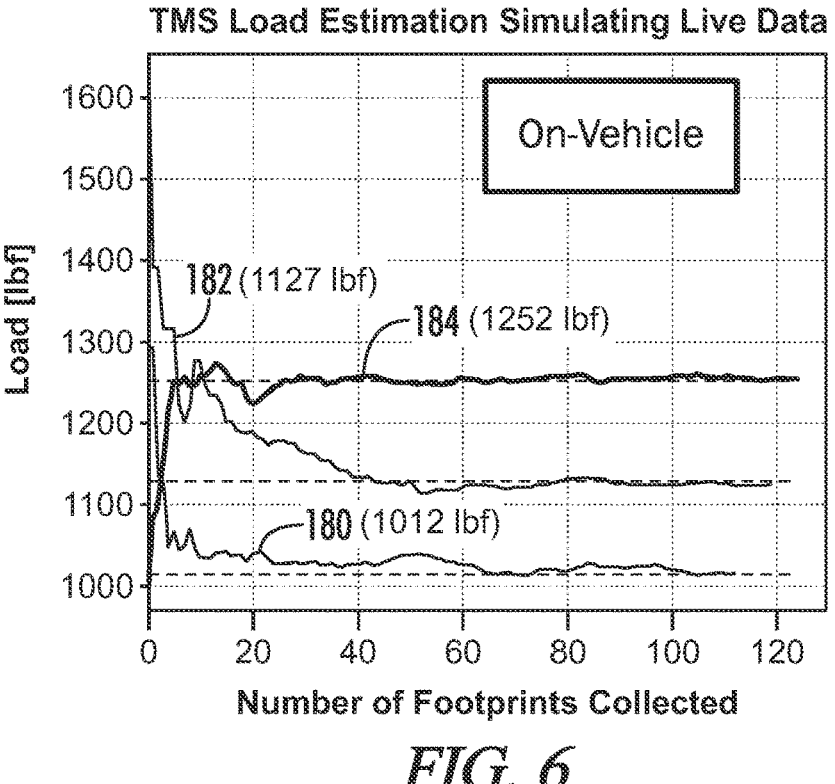
FIG. 6 is a graphical diagram representing load estimation results using an embodiment of a method as disclosed herein for on-vehicle tests.

FIG. 6 illustrates exemplary results using the above-referenced method 200 to estimate load acting upon a tire for an on-vehicle test, wherein test results 180, 182, 184 each stabilize after a number of footprints collected within fifty pounds (lbf) of an actual load.

Figure 7:
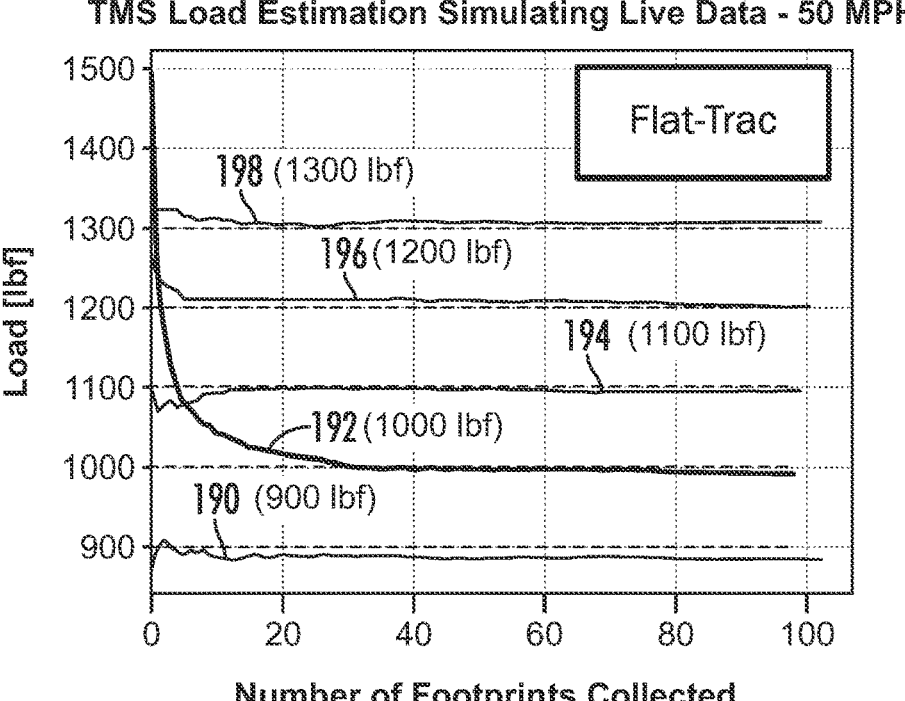
FIG. 7 is a graphical diagram representing load estimation results using an embodiment of a method as disclosed herein for flat belt tests.

FIG. 7 illustrates further exemplary results using the above-referenced method 200 to estimate load acting upon a tire for a flat belt test at fifty miles per hour (mph), wherein test results 190, 192, 194, 196, and 198 each also stabilize after a number of footprints collected within fifty lbf of an actual load.

Throughout the specification and claims, the following terms take at least the meanings explicitly associated herein, unless the context dictates otherwise. The meanings identified below do not necessarily limit the terms, but merely provide illustrative examples for the terms.

The meaning of "a," "an," and "the" may include plural references, and the meaning of "in" may include "in" and "on."

The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to methods executed by or on behalf of fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire internal air pressure loss and potential disabling, replacement, or intervention.

The term "user" as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for estimating at least one force acting upon at least one tire mounted on a vehicle, the method comprising:
   a) detecting an acceleration waveform of a tire in a tire radial direction from sampled outputs of a tire-mounted acceleration sensor;
   b) integrating the acceleration waveform in the tire radial direction to generate a velocity waveform;
   c) calculating a number of samples during ground contact from at least first and second peaks in the velocity waveform;
   d) calculating a ground contact length based on at least the calculated number of samples during ground contact, a sampling rate of the outputs of the tire-mounted acceleration sensor, and a velocity of the vehicle;
   e) estimating at least one force acting on the tire from the calculated ground contact length; and
   f) generating an output signal corresponding to the estimated at least one force acting on the tire.

2. The method according to claim 1, further comprising:
   performing each of steps a) to f) for each of a plurality of acceleration sensors mounted laterally across an inner liner of the tire;
   calculating changes in ground contact length with respect to a respective width between two or more of the plurality of acceleration sensors; and
   estimating the at least one force on the tire based on the calculated changes in ground contact length with respect to a respective width between two or more of the plurality of acceleration sensors.

3. The method according to claim 2, wherein the estimated at least one force comprises one or more of a slip angle on the tire and an inclination angle.

4. The method according to claim 1, wherein:
   the estimated at least one force acting upon the tire comprises a load;
   at least one map representing a relationship between the ground contact length, the velocity of the vehicle, and the load acting on the tire is predetermined and retrievably stored, and
   in step e), the load acting on the tire is estimated from the calculated ground contact length, the velocity of the vehicle, and the map.

5. The method according to claim 4, wherein the output signal is provided to a user interface associated with the vehicle for display to a user of the vehicle.

6. The method according to claim 4, wherein the output signal is provided to a user interface associated with a remote computing device via a fleet management telematics platform.

7. The method according to claim 4, wherein the output signal is provided to a vehicle control unit.

8. The method according to claim 7, wherein the estimated load is utilized as an input to a tire wear detection model.

9. The method according to claim 7, wherein the estimated load is utilized as an input to a tire traction detection model.

10. The method according to claim 7, wherein the estimated load is utilized as an input to a tire durability and health model.

11. A system for estimating at least one force acting on at least one tire mounted on a vehicle, the system comprising:

a tire-mounted acceleration sensor configured to generate output signals corresponding to sampled acceleration of a tire in a tire radial direction; and a controller linked for communication with the tire-mounted acceleration sensor and further configured to direct the performance of operations comprising:

detect an acceleration waveform of the tire in the tire radial direction from sampled outputs of the tire-mounted acceleration sensor;

integrating the acceleration waveform in the tire radial direction to generate a velocity waveform;

calculate a number of samples during ground contact from at least first and second peaks in the velocity waveform;

calculate a ground contact length based on at least the calculated number of samples during ground contact, a sampling rate of the outputs of the tire-mounted acceleration sensor, and a velocity of the vehicle;

estimate at least one force acting on the tire from the calculated ground contact length; and generate an output signal corresponding to the estimated at least one force acting on the tire.

12. The system of claim 11, wherein the operations are performed for each of a plurality of acceleration sensors mounted laterally across an inner liner of the tire, and the controller is further configured to:

calculate changes in ground contact length with respect to a respective width between two or more of the plurality of acceleration sensors; and estimate the at least one force on the tire based on the calculated changes in ground contact length with respect to a respective width between two or more of the plurality of acceleration sensors.

13. The system of claim 12, wherein the estimated at least one force comprises one or more of a slip angle on the tire and an inclination angle.

14. The system of claim 11, wherein:

the estimated at least one force acting upon the tire comprises a load;

at least one map representing a relationship between the ground contact length, the velocity of the vehicle, and the load acting on the tire is predetermined and retrievably stored, and in step e), the load acting on the tire is estimated from the calculated ground contact length, the velocity of the vehicle, and the map.

15. The system of claim 14, wherein the output signal is provided to a user interface associated with the vehicle for display to a user of the vehicle.

16. The system of claim 14, wherein the output signal is provided to a user interface associated with a remote computing device via a fleet management telematics platform.

17. The system of claim 14, wherein the output signal is provided to a vehicle control unit.

18. The system of claim 17, wherein the estimated load is utilized as an input to a tire wear detection model.

19. The system of claim 17, wherein the estimated load is utilized as an input to a tire traction detection model.

20. The system of claim 17, wherein the estimated load is utilized as an input to a tire durability and health model.

\* \* \* \* \*